(12) United States Patent
Alsubaih et al.

(10) Patent No.: US 9,677,401 B1
(45) Date of Patent: Jun. 13, 2017

(54) RADIAL PISTON ROTARY DEVICE WITH COMPACT GEAR DRIVE MECHANISM

(71) Applicants: Adel K. Alsubaih, Safat (KW); Khaled A. Alsubaih, Safat (KW)

(72) Inventors: Adel K. Alsubaih, Safat (KW); Khaled A. Alsubaih, Safat (KW)

( * ) Notice: Subject to any disclaimer, the term of this patent is extended or adjusted under 35 U.S.C. 154(b) by 0 days.

(21) Appl. No.: 15/295,985

(22) Filed: Oct. 17, 2016

(51) Int. Cl.
| | | |
|---|---|---|
| *F16H 1/28* | (2006.01) | |
| *F01C 1/077* | (2006.01) | |
| *F02B 53/12* | (2006.01) | |
| *F01C 21/10* | (2006.01) | |
| *F01C 21/08* | (2006.01) | |
| *F01C 21/06* | (2006.01) | |
| *F16H 57/08* | (2006.01) | |
| *F16F 15/30* | (2006.01) | |
| *F16H 35/00* | (2006.01) | |

(52) U.S. Cl.
CPC .............. *F01C 1/077* (2013.01); *F01C 21/06* (2013.01); *F01C 21/08* (2013.01); *F01C 21/106* (2013.01); *F02B 53/12* (2013.01); *F16F 15/30* (2013.01); *F16H 1/28* (2013.01); *F16H 57/082* (2013.01); *F16H 2035/001* (2013.01)

(58) Field of Classification Search
CPC ........ F01C 21/106; F01C 1/077; F01C 21/08; F01C 21/06; F02B 53/12; F16H 57/082; F16H 1/28; F16H 2035/001; F16F 15/30
USPC ................................ 123/241, 242, 246, 43 B
See application file for complete search history.

(56) References Cited

U.S. PATENT DOCUMENTS

| | | | | |
|---|---|---|---|---|
| 1,163,142 A | * | 12/1915 | Smith .................... | F01C 1/077 418/36 |
| 2,349,848 A | * | 5/1944 | Davids ................... | F01C 1/077 418/36 |
| 2,480,193 A | | 8/1949 | Miles | |
| 3,203,405 A | * | 8/1965 | Sabet ..................... | F01C 1/077 418/18 |
| 3,483,578 A | * | 12/1969 | Harrison ................ | F01C 1/07 418/37 |
| 3,592,571 A | * | 7/1971 | Drury ..................... | F01C 1/07 418/36 |
| 3,746,480 A | * | 7/1973 | Ryen ...................... | F01C 1/07 418/37 |

(Continued)

FOREIGN PATENT DOCUMENTS

| | | |
|---|---|---|
| GB | 465211 | 5/1937 |
| GB | 502915 | 3/1939 |

*Primary Examiner* — Jesse Bogue
*Assistant Examiner* — Jason T Newton
(74) *Attorney, Agent, or Firm* — Richard C. Litman (57) ABSTRACT

The radial piston rotary device with compact gear drive mechanism includes a base, a casing mounted to the base, and a gearbox coupled to the casing. The casing houses a piston assembly with a pair of first radial pistons and a pair of second radial pistons coaxially mounted to the first radial pistons with each pair rotating at asynchronous, cyclically varying velocities. During a power cycle, a leading pair of radial pistons powers the associated gear assembly, and the gear assembly drives a flywheel assembly. A drive shaft axially extends from the flywheel assembly outside the gearbox to be selectively coupled to a driven component. The flywheel drives the pair of lagging radial pistons. During operation, each pair of radial pistons rotate at cyclically varying angular velocities out of phase with each other, yet produce a uniform output to the drive shaft.

13 Claims, 6 Drawing Sheets

(56) References Cited

U.S. PATENT DOCUMENTS

| | | | | |
|---|---|---|---|---|
| 3,890,939 | A * | 6/1975 | McIntosh | F01C 19/00 418/36 |
| 4,194,871 | A * | 3/1980 | Studenroth | F01C 1/067 418/38 |
| 5,069,604 | A * | 12/1991 | Al-Sabih | F01C 1/077 123/245 |
| 5,083,540 | A | 1/1992 | Smith | |
| 5,433,179 | A * | 7/1995 | Wittry | F01C 1/07 123/202 |
| 5,537,973 | A * | 7/1996 | Wittry | F01C 1/077 123/202 |
| 6,321,693 | B1 * | 11/2001 | Kim | F01C 9/002 123/18 R |
| 6,659,066 | B1 | 12/2003 | Lee | |
| 2003/0200951 | A1 * | 10/2003 | Morgado | F01C 1/07 123/245 |
| 2006/0027207 | A1 * | 2/2006 | Hangan | F01C 1/077 123/245 |
| 2010/0180858 | A1 * | 7/2010 | Omori | F01C 1/073 123/245 |
| 2010/0251991 | A1 * | 10/2010 | Drachko | F01C 1/07 123/221 |
| 2014/0109864 | A1 | 4/2014 | Drachko | |

* cited by examiner

RADIAL PISTON ROTARY DEVICE WITH COMPACT GEAR DRIVE MECHANISM

BACKGROUND OF THE INVENTION

1. Field of the Invention

The present invention relates to mechanical drive systems, and particularly to a radial piston rotary device with compact gear drive mechanism to facilitate smooth and adjustable synchronous rotation of the output shaft.

2. Description of the Related Art

Rotary drives have proven to be a relatively simple, compact and efficient means of providing power. However, they have not achieved their maximum acceptance due to the difficulties encountered in governing and converting the varying rotational speeds of the piston shafts into uniform rotational motion. Many systems have been devised including ring and pinion drives, cam drives, ratchet mechanisms, irregular gears, scissor crank drives, and linkage mechanisms to address such issues. While all of these drive systems are theoretically functional, they tend to be unduly complex, unreliable, and inefficient.

There is still a need for a rotary drive that is relatively simple, reliable, and efficient in power delivery. Thus, a radial piston rotary device with compact gear drive mechanism solving the aforementioned problems is desired.

SUMMARY OF THE INVENTION

The radial piston rotary device with compact gear drive mechanism includes a base, a casing mounted to the base, and a gearbox coupled to the casing. The casing houses a piston assembly with a pair of first radial pistons and a pair of second radial pistons coaxially mounted to the first radial pistons with each pair rotating at asynchronous, cyclically varying velocities governed by a gear and pinion inside the gearbox. During a power cycle, a leading pair of radial pistons powers the associated gear assembly, and the gear assembly drives a flywheel assembly. A drive shaft axially extends from the flywheel assembly outside the gearbox to be selectively coupled to a driven component. The flywheel also drives the pair of lagging radial pistons. During operation, each pair of radial pistons rotate at cyclically varying angular velocities out of phase with each other, yet produce a uniform output to the drive shaft via the gear and flywheel assemblies. Components may be adjusted to produce optimal performance.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
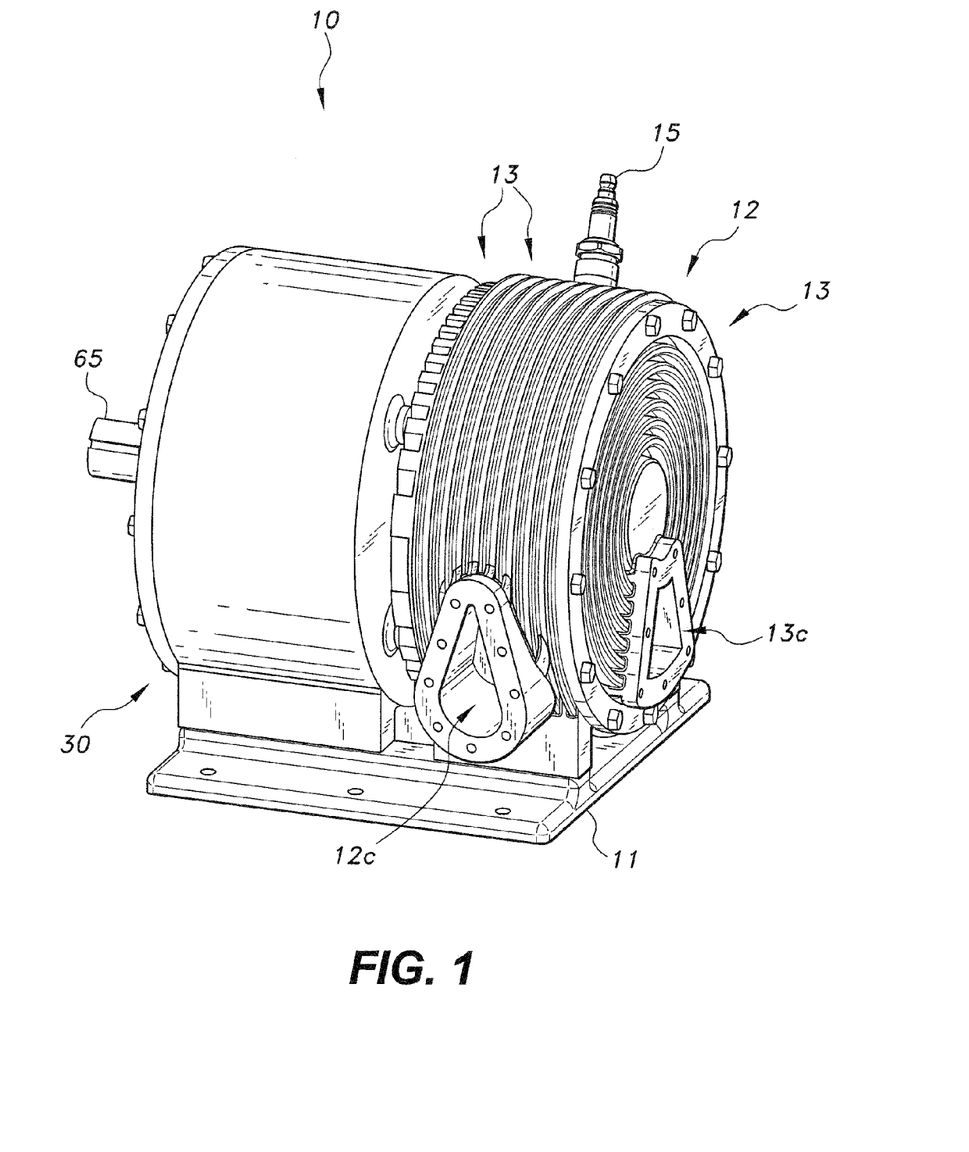
FIG. 1 is an environmental, perspective view of a radial piston rotary device with compact gear drive mechanism according to the present invention.
Figure 2:
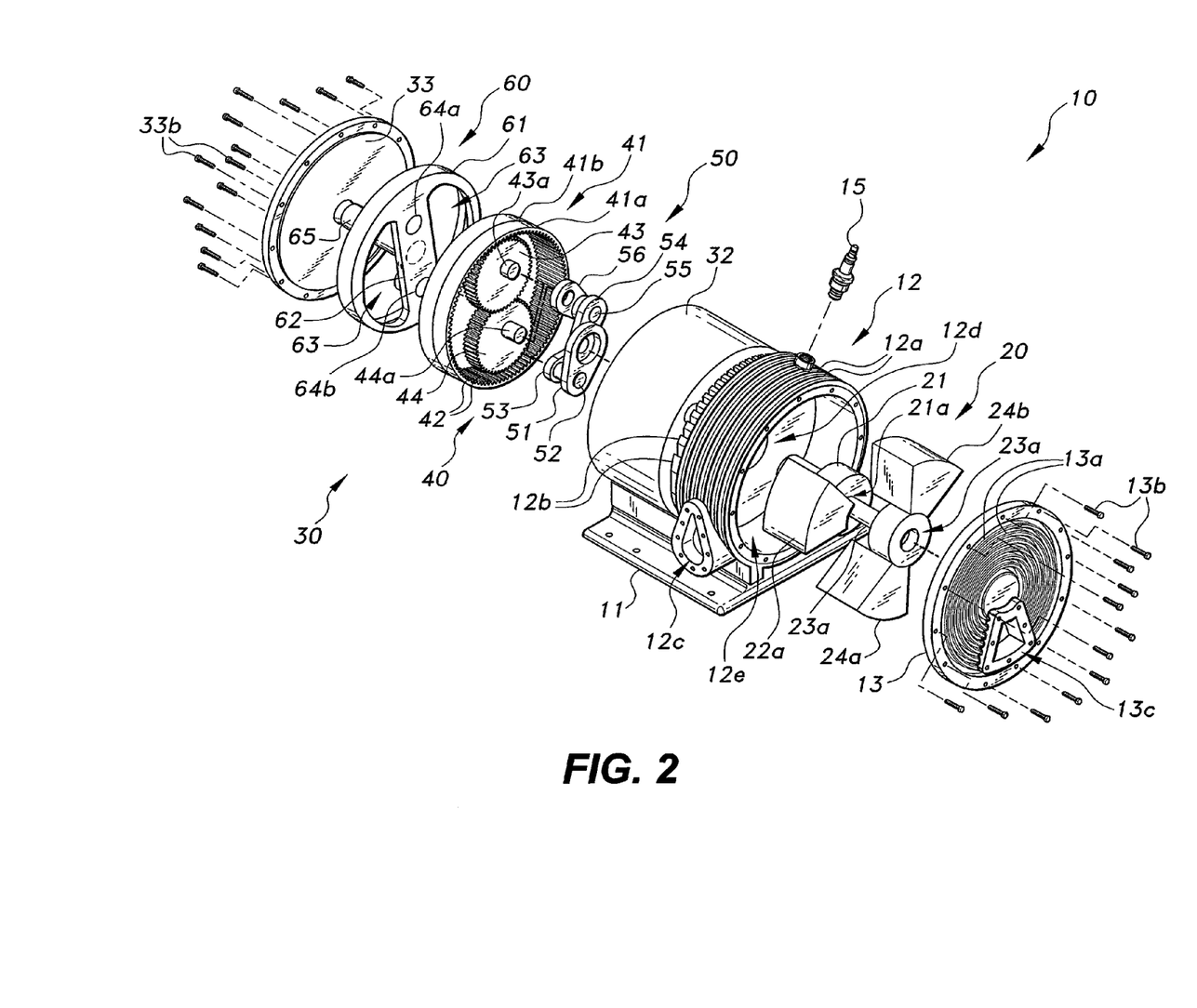
FIG. 2 is an exploded view of the radial piston rotary device shown in FIG. 1 as seen from a front perspective.
Figure 3:
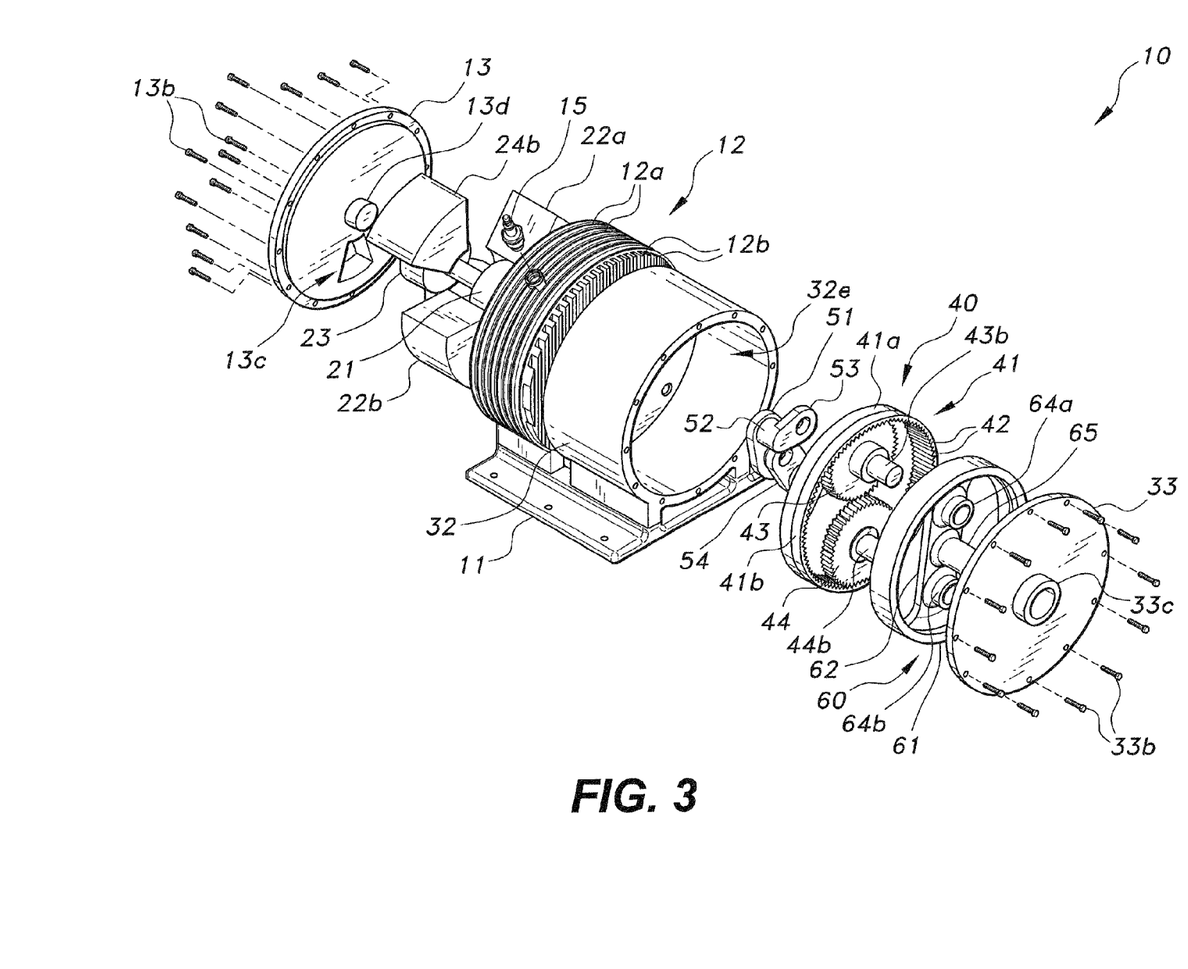
FIG. 3 is an exploded view of the radial piston rotary device shown in FIG. 1 as seen from a back perspective.

The radial piston rotary device with compact gear drive mechanism, generally referred to by the reference number 10 in the Figures, provides efficient and reliable delivery of power to enable uniform rotation of an output shaft from non-uniform rotations of rotary pistons. As best seen in FIGS. 1-3, the radial piston rotary device 10 includes a base 11, a housing or casing 12 mounted to the base 11, and a drive assembly 30 coupled to and communicating with the casing 12.

The casing 12 is preferably a hollow, generally open-ended cylinder housing a rotary piston assembly 20 and defining a recessed chamber 12e therein. A detachable endcap 13 securely closes the open end via one or more fasteners, e.g., bolts 13b, screws, and the like. The radial piston rotary device 10 may be used with any type of powered means, such as an internal combustion engines (ICE), electric, pneumatic, or hydraulic. In an exemplary embodiment, the radial piston rotary device 10 is used as a combustion engine performing a typical four-stroke function of an Ottoman cycle, i.e., intake, compression, power, and exhaust, these functions being performed by radial pistons 22a, 22b, 24a, 24b in the radial piston assembly 20. A spark plug 15 is detachably mounted to the casing 12 and operatively communicates with the chamber 12e. The casing 12 is preferably provided with a heat exchange system to dissipate excess heat generated by the radial piston rotary device 10 during normal operation. As shown, the heat exchange system may include a plurality of spaced, annular rings or heat fins 12a radially extending from the circumference of the casing 12, a plurality of concentric annular rings 13a axially extending from an outer face of the endplate 13, and a plurality of chordal heat fins 12b extending axially from an outer surface of the closed end. These heat fins 12a, 12b, 13a provide a relatively large surface area to efficiently transfer heat and maintain the predefined or desired operating temperatures.

As a preferred use as an ICE, the endcap 13 is provided with an intake port 13c formed on or detachably mounted, e.g. via a separate intake shroud, to the endcap 13 and an exhaust port 12c formed or detachably mounted, e.g. via a separate exhaust shroud, extending from the outer wall of the open-ended cylinder. If employing a shroud-type structure, the shroud-type structure is preferably cast or fixedly mounted to the corresponding component for durability, strength, and seal. The intake port 13c allows a desired or required amount of fuel-air mixture into the chamber defined by the interior of the casing 12. Spent fuel-air mixture and waste gas is expelled through the exhaust port 12c. The exhaust port 12c can correspond to the rotated position of the radial pistons 22a, 22b, 24a, 24b in relation to the intake port 13c. Exhausting spent air-fuel mixture for the desired or required performance depends on various factors such as the ratio of fuel to air in the mixture, combustion efficiency, and environmental impact factors governing potential harmful byproducts.

The rotary piston assembly 20 is rotatably mounted inside the chamber 12e of the casing 12. The rotary piston assembly 20 includes a pair of first radial pistons 22a, 22b extending in diametrically opposite directions from an elongate first rotary piston shaft 21 and a pair of second radial pistons 24a, 24b extending in diametrically opposite directions from an elongate second rotary piston shaft 23.

The first rotary piston shaft 21 is insertably mounted through a shaft support bore 12d extending through the backwall of the casing 12 when assembled. The first rotary piston shaft 21 is preferably divided into two sections forming an elongate stepped shaft. The first section forms a relatively wide or large diameter hub from which the first radial pistons 22a, 22b extend while the second section forms an integral, relatively narrow or small diameter bar coaxially extending from the first section. The second section slides into the shaft support bore 12d. Therefore, the diameter of the second section can be somewhat less than a diameter of the shaft bore 12d.

Each first radial piston 22a, 22b is generally a wedge-shaped arc segment with about half of the overall length extending past a front end of the first section of the first rotary piston shaft 21 opposite from the extension of the second section. A shaft bore 21a extends through the first rotary piston shaft 21.

The second rotary piston shaft 23 is configured to be rotatably mounted to the shaft bore 21a on the first rotary piston shaft 21 when assembled. Much like the first rotary piston shaft 21, the second rotary piston shaft 23 is preferably divided into two sections forming an elongate stepped shaft. The first section forms a relatively wide or large diameter hub from which the second radial pistons 24a, 24b extend while the second section forms an integral, relatively narrow or small diameter bar coaxially extending from the first section. This second section rotatably fits inside shaft bore 21a, and as a result, has a generally smaller diameter than the second section of the first rotary piston shaft 21. The first section of the second rotary piston shaft 23 preferably has the same general diameter as the first section of the first rotary piston shaft 21. When assembled, the first section of the first rotary piston shaft 21 and the second rotary piston shaft 23 form a uniformly dimensioned hub.

Each second radial piston 24a, 24b is generally a wedge-shaped arc segment with about half of the overall length extending backward towards the second section of the second rotary piston shaft 23. The second rotary piston shaft 23 may also be provided with an axially extending shaft bore 23a to reduce weight while maintaining structural rigidity and strength. A shaft support pin 13d axially extends from the opposite face of the endcap 13 to plug the opening of the shaft bore 23a and rotatably support the front end of the second rotary piston shaft 23 when assembled.

Figure 4:
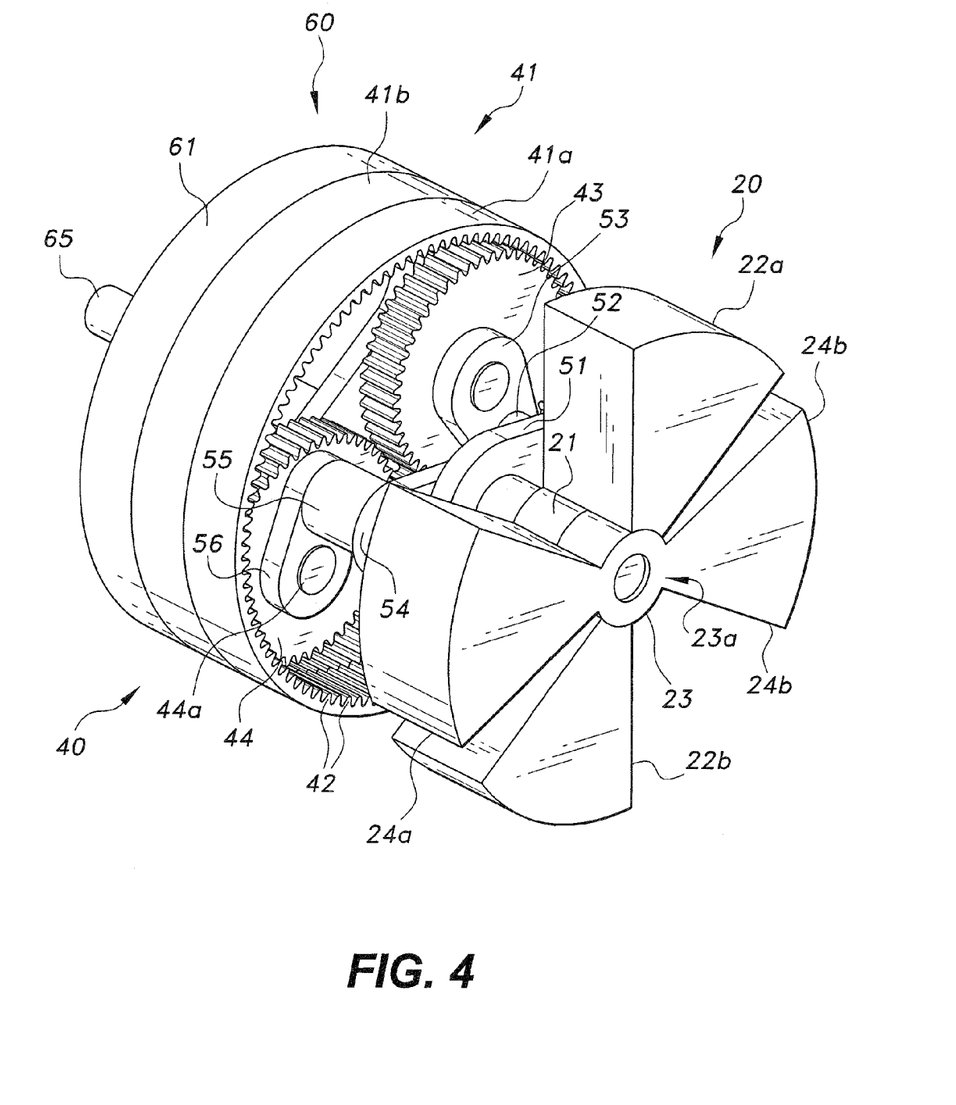
FIG. 4 is a perspective view of a rotary piston assembly and flywheel assembly in the radial piston rotary device shown in FIG. 1.

As best seen from FIGS. 2-4, portions of the first radial pistons 22a, 22b and second radial pistons 24a, 24b extend in opposite, axial directions. The first radial pistons 22a, 22b and second radial pistons 24a, 24b can have a cyclically varying speed ratio. The axial lengths of the radial pistons 22a, 22b, 24a, 24b are equal, and the axial length can be about the same as the axial depth of the chamber 12e. The first rotary piston shaft 21 and the second rotary piston shaft 23 can have a stepped construction to enable coaxial, nested mounting of the shafts 21, 23. When thus coupled, each piston pair rotates at asynchronous, cyclically varying speed ratios. The opposite extended portions of the radial pistons 22a, 22b, 24a, 24b facilitates coaxial meshed engagement between the pairs of radial pistons so that when assembled, the meshed radial pistons and their corresponding first sections of the shafts 21, 23 form a generally thick, disk-shaped block. The assembled rotary piston assembly 20 fits inside the chamber 12e with relatively close tolerances due to the axial lengths of the radial pistons 22a, 22b, 24a, 24b and the depth of the chamber 12e being generally the same. The distal ends of the first rotary piston shaft 21 and the second rotary piston shaft 23 extend into the drive assembly 30.

The drive assembly 30 includes a gearbox or housing 32 coupled to the casing 12. The gearbox 32 houses a gear assembly 40 and a flywheel assembly 60 therein, the flywheel assembly 60 being coupled to the gear assembly 40. Much like the casing 12, the gearbox 32 is preferably a hollow, generally open-ended cylinder defining a recessed chamber 32e therein. A detachable endcap 33 securely closes the open end via one or more fasteners, e.g., bolts 33b, screws, and the like.

The gear assembly 40 includes an annular rack 41 divided into a first rack section 41a and a second rack section 41b. Both sections 41a, 41b may be separate racks fixed to each other by any conventional means such as welds, adhesives, fasteners, and the like, or constructed as a single, integral or unitary component via molding, forging, and the like. With respect to the latter, it is to be understood that the separate sections will be used by their corresponding, interactive components. The annular rack 41 has a relatively smooth outer surface and a plurality of inner rack teeth 42. The smooth outer surface permits the annular rack 41 to fit inside the chamber 32e when assembled. The pitch and number of rack teeth 42 is preferably the same for both sections 41a, 41b.

A pair of planetary gears, a first planetary gear 43 and a second planetary gear 44, engages the rack teeth 42 and orbits about the interior during operation. The planetary gears 43, 44 are arranged so that the second planetary gear 44 is axially offset or spaced from the first planetary gear 43. This offset prevents the planetary gears 43, 44 from meshing with each other. By this arrangement, the first planetary gear 43 orbits along the first section 41a while the second planetary gear 44 orbits along the second section 41b of the annular rack 41 without mutual interference. Each planetary gear 43, 44 has gear teeth matching the rack teeth 42. Preferably, the gear ratio between the planetary gears 43, 44 and the annular rack 41 is about 1:2.

The radial piston rotary device 10 includes a crank assembly 50 operatively coupled between the output ends of the rotary piston shafts 21, 23 and the planetary gears 43, 44 to facilitate rotary, orbital motion of the planetary gears 43, 44 in response to the rotations of the piston shafts 21, 23. It is noted that the planetary gears 43, 44 do not orbit with uniform angular velocity inside the annular rack 41. Each planetary gear 43, 44 includes a corresponding eccentric, i.e., radially offset, crank pin 43a, 44a coupled to the crank assembly 50 such that during a full orbit around the respective first rack section 41a and second rack section 41b, the angular velocity cyclically varies for each planetary gear 43, 44. However, the respective velocities are out of phase such that the output from the drive assembly 30 is uniform.

The crank assembly 50 includes an elongate first crank arm or rocker arm 51 with one end coupled to the output end of the first rotary piston shaft 21. This end of the first crank arm 51 is preferably locked, fastened, or fixed to the first rotary piston shaft 21 so as to rotate or pivot with rotations of the first rotary piston shaft 21. An elongate second crank arm or coupler arm 53 is pivotally mounted to the opposite end of the first crank arm 51 by an elongate pivot pin 52. The opposite end of the second crank arm 53 is coupled to the crank pin 43a of the first planetary gear 43. This arrangement of the first crank arm 51, pivot pin 52, and the second crank arm 53 drive the rotary orbital movement of the first planetary gear 43 in response to the rotations of the first rotary piston shaft 21. Due to this mechanical link, the one end of the first crank arm 51 is provided with a relatively large diameter mounting bore to accommodate and receive the output end of the first rotary piston shaft 21, and the pivot pin 52 is relatively long to span the distance between the first planetary gear 43 and the first crank arm 51.

The crank assembly 50 also includes an elongate third crank arm or rocker arm 54 with one end coupled to the output end of the second rotary piston shaft 23. This end of the third crank arm 54 is preferably locked, fastened, or fixed to the second rotary piston shaft 23 so as to rotate with rotations of the second rotary piston shaft 23. An elongate fourth crank arm or coupler arm 56 is pivotally mounted to the opposite end of the third crank arm 54 by an elongate pivot pin 55. The opposite end of the fourth crank arm 56 is coupled to the crank pin 44a of the second planetary gear 44. This arrangement of the third crank arm 54, pivot pin 55, and the fourth crank arm 56 drive the rotary orbital movement of the second planetary gear 44 in response to the rotations of the second rotary piston shaft 23. Due to this mechanical link, one end of the third crank arm 54 is provided with a relatively small diameter mounting bore to accommodate and receive the output end of the second rotary piston shaft 23, and the pivot pin 55 is of suitable length to span the distance between the second planetary gear 44 and the third crank arm 54. The crank linkage for the first planetary gear 43, i.e. the first crank arm 51, pivot pin 52, and the second crank arm 53, is axially staggered from the crank linkage for the second planetary gear 44, i.e. the third crank arm 54, pivot pin 55, and fourth crank arm 56, to accommodate the axial offset of the planetary gears 43, 44 thereby enable relative movements of the linkages without interference. Moreover, the mounted ends of the first crank arm 51 and the third crank atm 54 are coaxially aligned corresponding with the coaxial arrangement of the rotary piston shafts 21, 23. It can be seen from the above description and the Figures that the gear assembly 40 is relatively compact, even with the inclusion of the crank assembly 50, and occupies a relatively small amount of space. Though compact, the gear assembly 50 enables efficient and suitable delivery of power.

Rotation of the planetary gears 43, 44 drives the flywheel assembly 60. The flywheel assembly 60 includes an annular flywheel 61 divided by a diametrically extending cross beam or spoke 62. The flywheel 61 is preferably lightweight yet provided with suitable mass for the desired operation and performance and includes cutouts 63 defining the cross beam 62. Moreover, the outer surface is preferably smooth and/or the diameter of the flywheel 61 is smaller than the diameter of the chamber 32e to enable unhindered rotation of the flywheel 61 during operation.

To drive the flywheel 61, each planetary gear 43, 44 includes a driver pin 43b, 44b, respectively, extending from the opposite side or face of the crank pin 43a, 44a. A pair of spaced driver sockets or bearings 64a, 64b are formed on the cross beam 62, and each driver socket 64a, 64b receives one of the driver pins 43b, 44b when assembled. Unlike the crank pins 43a, 44a, the driver pins 43b, 44b each extend coaxially from the corresponding planetary gear 43, 44 rather than from an offset axis. In other words, each driver pin 43b, 44b extends from a center axis of the respective planetary gear 43, 44. This connection between the planetary gears 43, 44 and the cross beam 62 maintains a constant, equal spacing with respect to the axis of rotation of the flywheel 61 so that as the planetary gears 43, 44 rotate and orbit about the annular rack 41, each driver pin 43b, 44b exerts a generally equal crank force component on the connected driver socket 64a, 64b. This assists in ensuring a uniform rotation of the flywheel 61.

A drive shaft 65 extends axially from behind the cross beam 62 and passes through an output hub 33c formed in the center of the endcap 33. The axial extension of the drive shaft 65 is preferably coaxial with the axis of rotation of the flywheel 61 so as to prevent any rotational imbalance, vibration, and/or loss of power output. The drive shaft 65 is selectively coupled to driven components or mechanism to harness the power therefrom.

FIGS. 5A, 5B, 6A, and 6B show snapshots of operational positions of the radial pistons 22a, 22b, 24a, 24b at various stages of a combustion cycle. It can be seen from FIGS. 5A and 5B that the chamber 12e is divided into four varying (in volume) sub-chambers depending on their relative rotated positions. These sub-chambers have been designated as sub-chamber I, sub-chamber II, sub-chamber III, and sub-chamber IV for purposes of description.

Figure 5A:
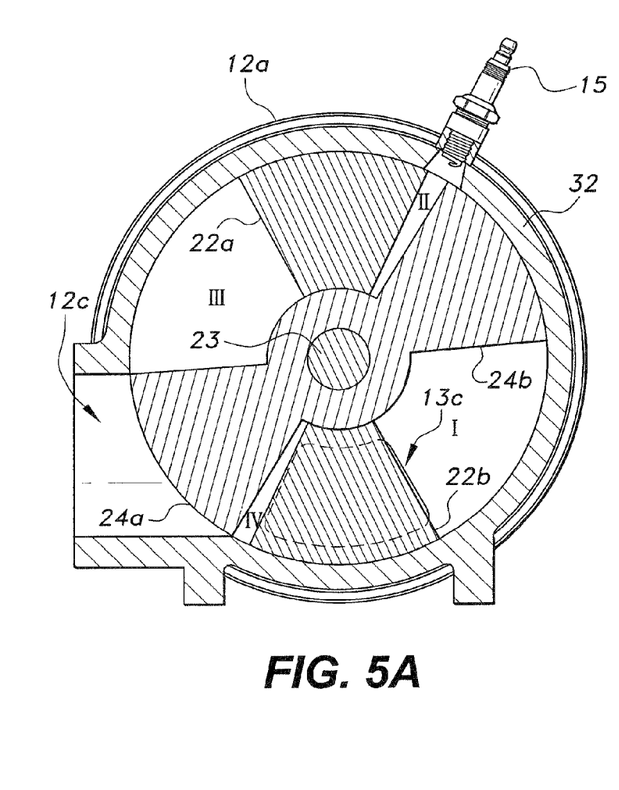
FIG. 5A is a sectional view of the radial piston rotary device shown in FIG. 1 at the beginning of a combustion and compression portion of a power cycle.
Figure 6A:
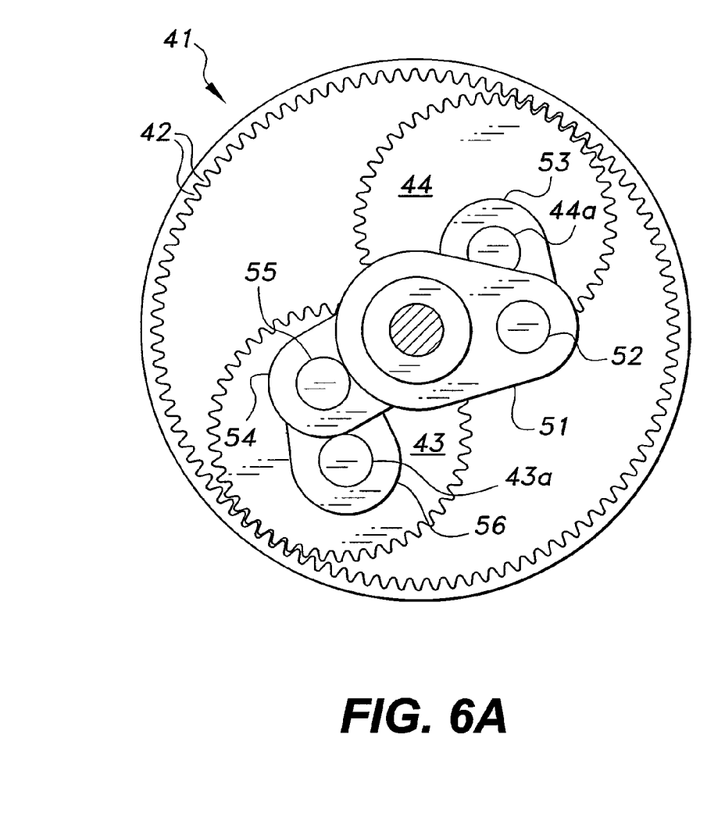
FIG. 6A is a rear plan view of a gear assembly in the radial piston rotary device shown in FIG. 1 corresponding to the combustion and compression portion of the power cycle shown in FIG. 5A.

As seen in FIG. 5A, the radial pistons 22a, 22b, 24a, 24b are in a transitional phase in which the velocity ratios change. FIG. 6A shows the corresponding position of the crank assembly 50. At this stage, the first radial pistons 22a, 22b are "lagging" while the second radial pistons 24a, 24b are "leading." The terms "leading" and "lagging" generally refer to their relative angular velocities. Thus, "leading" refers to relatively fast rotation rate, and "lagging" refers to relatively slow rotation rate. Moreover, the relative rotations of the pairs of radial pistons 22a, 22b and 24a, 24b are asynchronous.

Viewing the radial pistons 22a, 22b, 24a, 24b rotating counterclockwise, the radial piston 24b has just completed the intake cycle within sub-chamber I through the intake port 13c, and the radial piston 22b is about to start the compression cycle. In sub-chamber II, the radial piston 24b has rotated with respect to the radial piston 22a to compress the fuel-air mixture in preparation for ignition by the spark plug 15. Sub-chamber III shows the completed expansion cycle where the radial piston 24a has rotated with respect to the radial piston 22a from a previous ignition cycle and further rotating towards exhaust. Sub-chamber IV shows a fully exhausted state where the radial piston 24a has rotated to expel the waste through the exhaust port 12c and about to start the intake cycle.

Figure 5B:
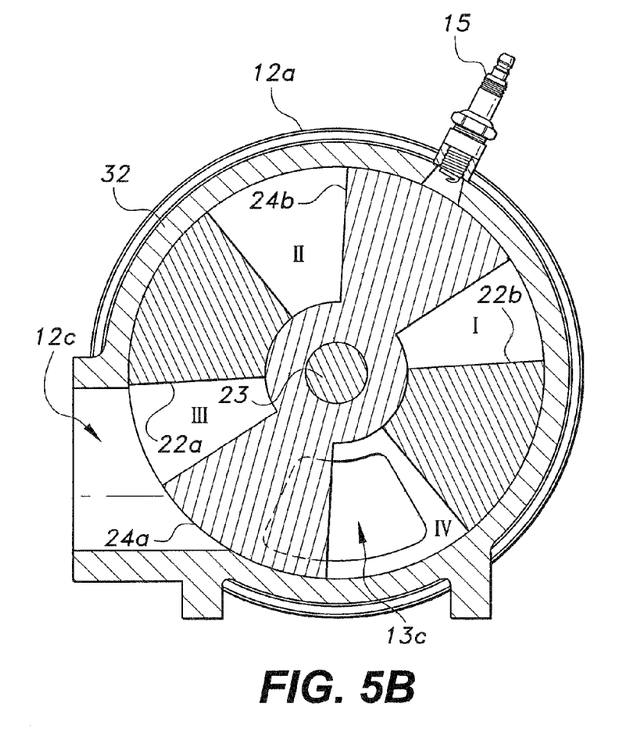
FIG. 5B is a sectional view of the radial piston rotary device shown in FIG. 1 during an exhaust and intake portion of the power cycle.
Figure 6B:
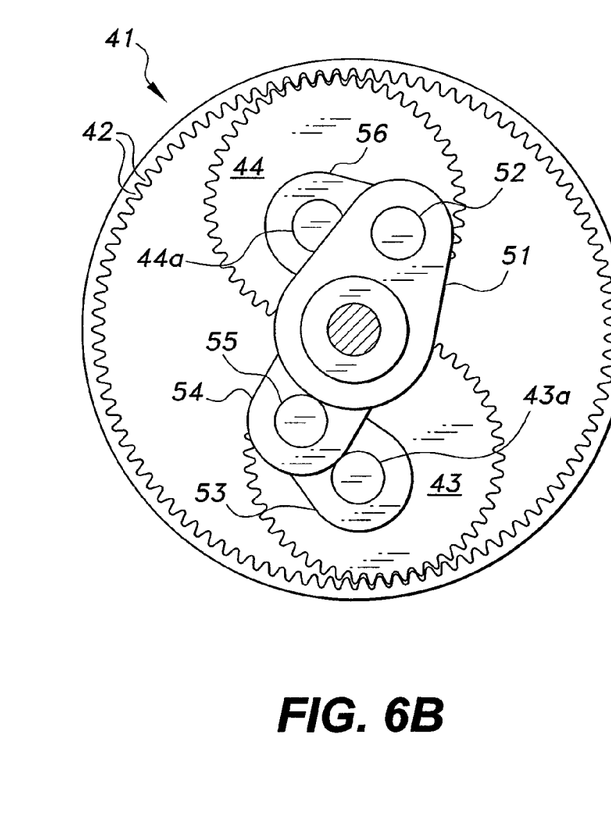
FIG. 6B is a rear plan view of the gear assembly in the radial piston rotary device shown in FIG. 1 corresponding to the exhaust and intake portion of the power cycle shown in FIG. 5B.

FIGS. 5B and 6B show the state of the components after transitioning from the state shown in FIGS. 5A and 6A in which the first radial pistons 22a, 22b are leading while the second radial pistons 24a, 24b are lagging. In this state, ignition has occurred causing the radial piston 22a, and hence the first radial pistons 22a, 22b, to rotate at a much faster rate resulting in expansion of the sub-chamber II. This action drives all of the other cycles. Thus, sub-chamber II is in an expansion/power cycle, sub-chamber III is in the exhaust cycle, sub-chamber IV is in the compression cycle, and sub-chamber I is in the compression cycle. Continued rotation of the first and second radial pistons 22a, 22b, 24a, 24b returns the rotary piston assembly 20 to the state shown in FIGS. 5A, 6A where the speed ratio shifts and the above process repeats. Though the relative rotations of the first radial pistons 22a, 22b and the second radial pistons 24a, 24b are asynchronous, the planetary gears 43, 44 and the crank assembly 50 transforms the asynchronous rotations into synchronous, uniform rotation of the flywheel assembly 60 and the drive shaft 65.

The operation of the rotary piston device 10 can be optimized by properly timing the ignition, angularly shifting the piston sets, and/or adjusting the compression ratio. The latter two features may be performed by slight adjustment to each planetary gear. This adjustment may be fixed during or after operation using, for example, servo motors, for high performance operation. Though not shown, the rotary piston device 10 may be provided with suitable seals and lubricant systems known in the art for normal operation.

It is to be understood that the present invention is not limited to the embodiments described above, but encompasses any and all embodiments within the scope of the following claims.

We claim:

1. A radial piston rotary device with compact gear drive mechanism, comprising:
   a base;
   a casing mounted to the base, the casing having an inner chamber;
   an endcap detachably mounted to an axial end of the casing to cover the casing;
   a rotary piston assembly rotatably mounted inside the chamber, the radial piston assembly having a pair of rotary first radial pistons and a pair of rotary second radial pistons, relative rotations of the first radial pistons and the second radial pistons forming and defining variable volume sub-chambers between adjacent radial pistons, each pair of first radial pistons and second radial pistons rotating at out-of-phase cyclically varying velocities with respect to each other during operation; the rotary piston assembly including:
      i) an elongate first rotary piston shaft rotatably mounted inside the chamber, said first rotary piston shaft having one end extending axially out a back end of said casing, said pair of first radial pistons extending radially in diametrically opposite directions from the opposite end of said first rotary piston shaft, and
      ii) an elongate second rotary piston shaft coaxially mounted to said first rotary piston shaft, said second rotary piston shaft having one end extending axially out said back end of said casing through said first rotary piston, said pair of second radial pistons extending radially in diametrically opposite directions from the opposite end of said second rotary piston shaft, said first radial pistons and said second radial pistons having a rotary meshed engagement with each other when assembled;
   a gearbox coupled to the casing, the gearbox having an inner chamber;
   an endcap detachably mounted to an axial end of the gearbox to cover the inner chamber;
   a gear assembly mounted inside the gearbox and coupled to the radial piston assembly, the gear assembly controlling the relative angular velocities of the first radial pistons and the second radial pistons to maintain an asynchronous, out-of-phase angular velocity relationship; the gear assembly including:
      i) an annular rack disposed inside said chamber of said gearbox, said annular rack having a plurality of inner gear teeth and divided into a first section and a second section;
      ii) a first planetary gear engaging said first section of said annular rack and orbital thereon, said first planetary gear having an eccentric crank pin extending axially from one face of said first planetary gear and a driver pin extending axially from the opposite face of said first planetary gear; and
      iii) a second planetary gear engaging said second section of said annular rack and orbital thereon, said second planetary gear being axially spaced from said first planetary gear, said second planetary gear having an eccentric crank pin extending axially from one face of said second planetary gear and a driver pin extending axially from the opposite face of said second planetary gear, the orbital movement of said planetary gears driving said flywheel assembly;
   a crank assembly coupling the rotary piston assembly to the gear assembly, the crank assembly transferring rotations of the first radial pistons and the second radial pistons to the gear assembly; and
   a flywheel assembly coupled to the gear assembly inside the inner chamber, the flywheel assembly having an elongate drive shaft axially extending out of the endcap of the gearbox to be coupled to at least one driven component, the gear assembly converting the out-of-phase angular velocities of the pairs of first radial pistons and second radial pistons into a uniform synchronous powered rotation of the drive shaft, the flywheel assembly including:
      i) an annular flywheel disposed inside the chamber of the gearbox adjacent said gear assembly;
      ii) a cross beam extending diametrically across the flywheel;
      iii) a pair of spaced driver sockets disposed on the cross beam, each driver socket adapted to receive a corresponding driver pin from the planetary gears; and
      iv) the drive shaft extends axially from the cross beam, and orbital movement of the planetary gears rotate the flywheel at uniform angular velocities to output power to the drive shaft.

2. The radial piston rotary device with compact gear drive mechanism according to claim 1, wherein said casing comprises a substantially open-ended cylinder and said endcap closes the open end.

3. The radial piston rotary device with compact gear drive mechanism according to claim 2, wherein said casing further comprises:
   an intake port defined in said endcap, said intake port facilitating introduction of intake gas;
   an exhaust port defined in a side of said cylinder, said exhaust port facilitating expulsion of exhaust gas; and
   a heat exchange system formed on the casing to dissipate excess heat generated during operation.

4. The radial piston rotary device with compact gear drive mechanism according to claim 3, wherein said heat exchange system comprises:
   a plurality of concentric heat fins extending axially from an outer face of said endcap;
   a plurality of annular heat fins extending radially from an outer surface of said cylinder; and
   a plurality of chordal heat fins extending axially from an outer face of the closed end of said cylinder.

5. The radial piston rotary device with compact gear drive mechanism according to claim 2, further comprising a spark plug detachably mounted to said cylinder, said spark plug communicating with said chamber of said cylinder to facilitate ignition and combustion when a sub-chamber has formed adjacent said spark plug for a power portion of each cyclical rotation.

6. The radial piston rotary device with compact gear drive mechanism according to claim 1, wherein each said first radial piston and said second radial piston comprises a substantially wedge-shaped arc segment.

7. The radial piston rotary device with compact gear drive mechanism according to claim 1, wherein said annular rack and said planetary gears have a gear ratio of about 1:2.

8. The radial piston rotary device with compact gear drive mechanism according to claim 1, wherein said crank assembly comprises:
an elongate first crank arm having one end coupled to said one end of said first rotary piston shaft extending axially out the back end of said casing;
a pivot pin coupled to the opposite end of said first crank arm;
an elongate second crank arm having one end coupled to said pivot pin and an opposite end coupled to said crank pin on said first planetary gear;
an elongate third crank arm having one end coupled to said one end of said second rotary piston shaft extending coaxially from said first rotary piston shaft;
a pivot pin coupled to the opposite end of said third crank arm; and
an elongate fourth crank arm having one end coupled to said pivot pin coupled to said third crank arm and an opposite end coupled to said crank pin on said second planetary gear.

9. A radial piston rotary device with compact gear drive mechanism, comprising:
a base;
a casing mounted to the base, the casing having an inner chamber;
an endcap detachably mounted to an axial end of the casing to cover the inner chamber;
a rotary piston assembly rotatably mounted inside the chamber, the radial piston assembly having a pair of rotary first radial pistons and a pair of rotary second radial pistons, the second radial pistons rotating independently of the first radial pistons, relative rotations of the first radial pistons and the second radial pistons forming and defining variable volume sub-chambers between adjacent radial pistons, each pair of first radial pistons and second radial pistons rotating at out-of-phase cyclically varying velocities with respect to each other during operation; and
a drive assembly coupled to the casing, the drive assembly having an elongate drive shaft adapted to be coupled to at least one driven component, the drive assembly converting the cyclically varying velocities of the radial pistons into uniform synchronous powered rotation of the drive shaft, the drive assembly includes:
i) a gearbox coupled to the casing, the gearbox having an inner chamber;
ii) an endcap detachably mounted to an axial end of the gearbox to cover the gearbox;
iii) a gear assembly mounted inside the gearbox and coupled to the radial piston assembly, the gear assembly controlling the relative angular velocities of the first radial pistons and the second radial pistons to maintain an asynchronous, out-of-phase angular velocity relationship;
iv) a crank assembly coupling the rotary piston assembly to the gear assembly, the crank assembly transferring rotations of the first radial pistons and the second radial pistons to the gear assembly; and
v) a flywheel assembly coupled to the gear assembly inside the inner chamber, the flywheel assembly having the drive shaft axially extending out of the endcap of the gearbox, the gear assembly converting the out-of-phase angular velocities of the pairs of first radial pistons and second radial pistons into the uniform synchronous powered rotation of the drive shaft, the flywheel assembly includes:
a) an annular flywheel disposed inside the chamber of the gearbox adjacent the gear assembly, wherein the annular flywheel is operational coupled to the gear assembly;
b) a cross beam extending diametrically across the flywheel;
c) a pair of spaced driver sockets disposed on said cross beam, each driver socket adapted to receive a corresponding driver pin from the planetary gears; and
d) the drive shaft extending axially from the cross beam, orbital movement of the gear assembly rotating the flywheel at uniform angular velocities to output power to the drive shaft.

10. The radial piston rotary device with compact gear drive mechanism according to claim 9, wherein said rotary piston assembly comprises:
an elongate first rotary piston shaft rotatably mounted inside the chamber, said first rotary piston shaft having one end extending axially out a back end of said casing, said pair of first radial pistons extending radially in diametrically opposite directions from the opposite end of said first rotary piston shaft; and
an elongate second rotary piston shaft coaxially mounted to said first rotary piston shaft, said second rotary piston shaft having one end extending axially out said back end of said casing through said first rotary piston, said pair of second radial pistons extending radially in diametrically opposite directions from the opposite end of said second rotary piston shaft, said first radial pistons and said second radial pistons having a rotary meshed engagement with each other when assembled.

11. The radial piston rotary device with compact gear drive mechanism according to claim 9, wherein said gear assembly comprises:
an annular rack disposed inside said chamber of said gearbox, said annular rack having a plurality of inner gear teeth and divided into a first section and a second section;
a first planetary gear engaging said first section of said annular rack and orbital thereon, said first planetary gear having an eccentric crank pin extending axially from one face of said first planetary gear and a driver pin extending axially from the opposite face of said first planetary gear; and
a second planetary gear engaging said second section of said annular rack and orbital thereon, said second planetary gear being axially spaced from said first planetary gear, said second planetary gear having an eccentric crank pin extending axially from one face of said second planetary gear and a driver pin extending axially from the opposite face of said second planetary gear, the orbital movement of said planetary gears driving said flywheel assembly.

12. The radial piston rotary device with compact gear drive mechanism according to claim 11, wherein said annular rack and said planetary gears have a gear ratio of about 1:2.

13. The radial piston rotary device with compact gear drive mechanism according to claim 11, wherein said crank assembly comprises:

an elongate first crank arm having one end coupled to said first radial pistons;

a pivot pin coupled to the opposite end of said first crank arm;

an elongate second crank arm having one end coupled to said pivot pin and an opposite end coupled to said crank pin on said first planetary gear;

an elongate third crank arm having one end coupled to said second radial piston;

a pivot pin coupled to the opposite end of said third crank arm; and an elongate fourth crank arm having one end coupled to said pivot pin coupled to said third crank arm and an opposite end coupled to said crank pin on said second planetary gear.

\* \* \* \* \*